United States Patent
Van Zeeland

[19]

[11] Patent Number: 6,069,552
[45] Date of Patent: May 30, 2000

[54] DIRECTIONALLY SENSITIVE SWITCH

[75] Inventor: Anthony J. Van Zeeland, Mesa, Ariz.

[73] Assignee: DuraSwitch Industries, Inc., Mesa, Ariz.

[21] Appl. No.: 09/324,567

[22] Filed: Jun. 2, 1999

[51] Int. Cl.[7] .................................................. H01C 10/06
[52] U.S. Cl. ................................ 338/92; 338/47; 338/99; 338/154; 200/512; 335/205
[58] Field of Search .......................... 200/511–512, 562, 200/6 A, 6 R, 514; 338/12, 92, 95, 97, 99, 118, 154, 47, 96; 273/148 B; 463/38; 335/205

[56] References Cited

U.S. PATENT DOCUMENTS

| | | | |
|---|---|---|---|
| 3,167,624 | 1/1965 | Jones, Jr. | 335/205 |
| 4,409,450 | 10/1983 | Blades | 200/512 |
| 5,475,353 | 12/1995 | Roshen et al. | 200/512 |
| 5,921,382 | 7/1999 | Retter | 335/205 |
| 5,949,325 | 9/1999 | Devolpi | 338/154 |

*Primary Examiner*—Karl Easthom
*Attorney, Agent, or Firm*—Dorn, McEachran, Jambor & Keating

[57] ABSTRACT

An electrical switch has spaced, facing coupler and carrier layers with a set of electrodes formed on the facing surfaces thereof. There is an aperture in the coupler layer. A conductive armature is disposed in the space between the coupler and carrier, aligned with the aperture. The coupler is a magnet and the armature is made of magnetic material so the armature is normally held in engagement with the coupler. A user can press on any part of the armature through the aperture to cause a first portion of the armature to break away from the armature and contact the electrodes on the carrier while a second portion of the armature remains in contact with the coupler. The electrodes are arranged to provide an output which is dependent upon the location of contact with the armature.

34 Claims, 2 Drawing Sheets

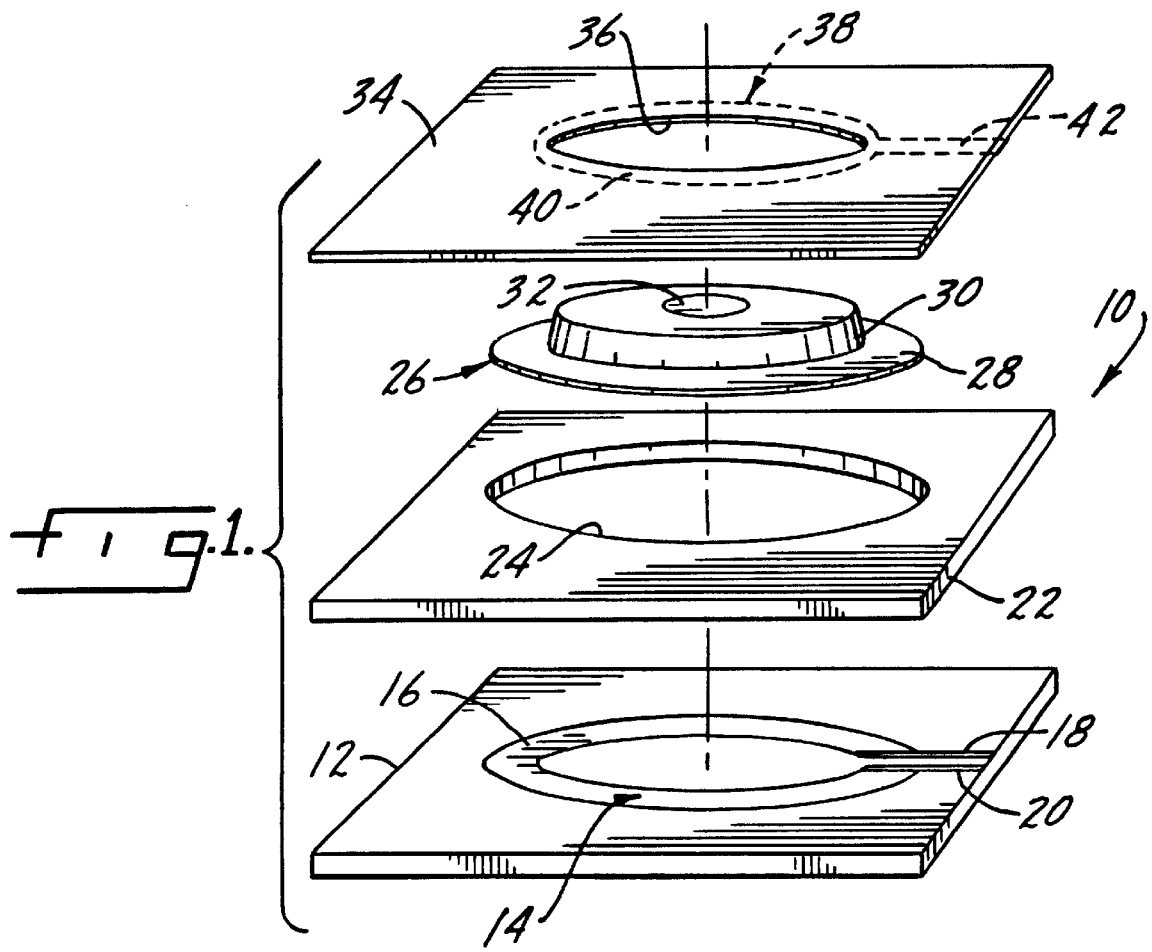
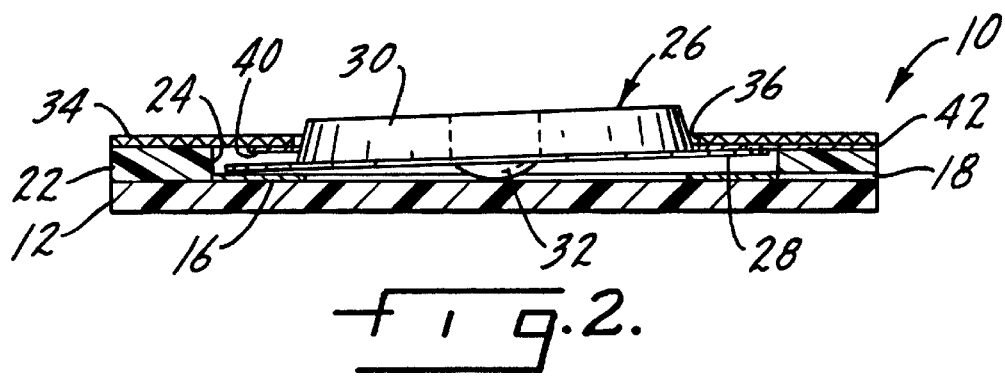

DIRECTIONALLY SENSITIVE SWITCH

BACKGROUND OF THE INVENTION

This invention relates to an electrical switch that is sensitive to the location on its actuating surface where it is depressed by a user. The switch has particular application to a personal computer's pointing device, commonly known as a mouse. A continuing problem with laptop computers is providing a compact, reliable and easy to use pointing device. The conventional mouse that fits in a user's palm is not an acceptable pointing device in a laptop computer because a laptop is typically used where there is no convenient desk surface on which to manipulate a conventional mouse. A conventional mouse is also too large for storage in a laptop computer. As a result of these drawbacks, laptops have not been equipped with a conventional mouse but instead have had various switches, trackballs and/or miniature joysticks built into their keyboards for use as pointing devices. These have met with varying success but many users still find them unsatisfactory. Cost and reliability are other concerns with prior art laptop mice. The present invention provides an electrical switch that resolves these problems and makes an excellent mouse switch. However, the switch is not limited to a mouse application. It can used anywhere a directional indication is needed.

SUMMARY OF THE INVENTION

The present invention concerns an electrical switch of the type having a conductive armature movable into and out of contact with a set of electrodes. The electrodes may be arranged to have spaced pads with the armature moving into and out of shorting relation with these pads. Or the electrodes may form a resistive element of a potentiometer with the armature providing a take-off element. Other electrode arrangements are possible to provide a desired logic or output. In any case, the electrodes are arranged to provide a variable output dependent on where the armature contacts the electrodes.

The switch has a carrier sheet on which the electrodes are formed. A coupler layer lies adjacent the carrier. A spacer separates the coupler and carrier and defines a cavity in which a conductive armature is disposed. The coupler is a magnet and the armature is made of material that is affected by a magnet. An aperture in the coupler provides access to the armature. A user-supplied actuating force acting through the aperture tilts a first portion of the armature into contact with the electrodes while a second portion of the armature remains in contact with the coupler. Any part of the armature can be pressed into contact with the electrodes so a variable output is produced depending on where the user pressed the armature. The coupler magnet retracts the armature from the electrodes when the actuating force is removed.

BRIEF DESCRIPTION OF THE DRAWINGS

FIG. 1 is an exploded perspective view of the switch according to the present invention.

FIG. 2 is a section through the switch of FIG. 1.

DETAILED DESCRIPTION OF THE INVENTION

Figure 3:
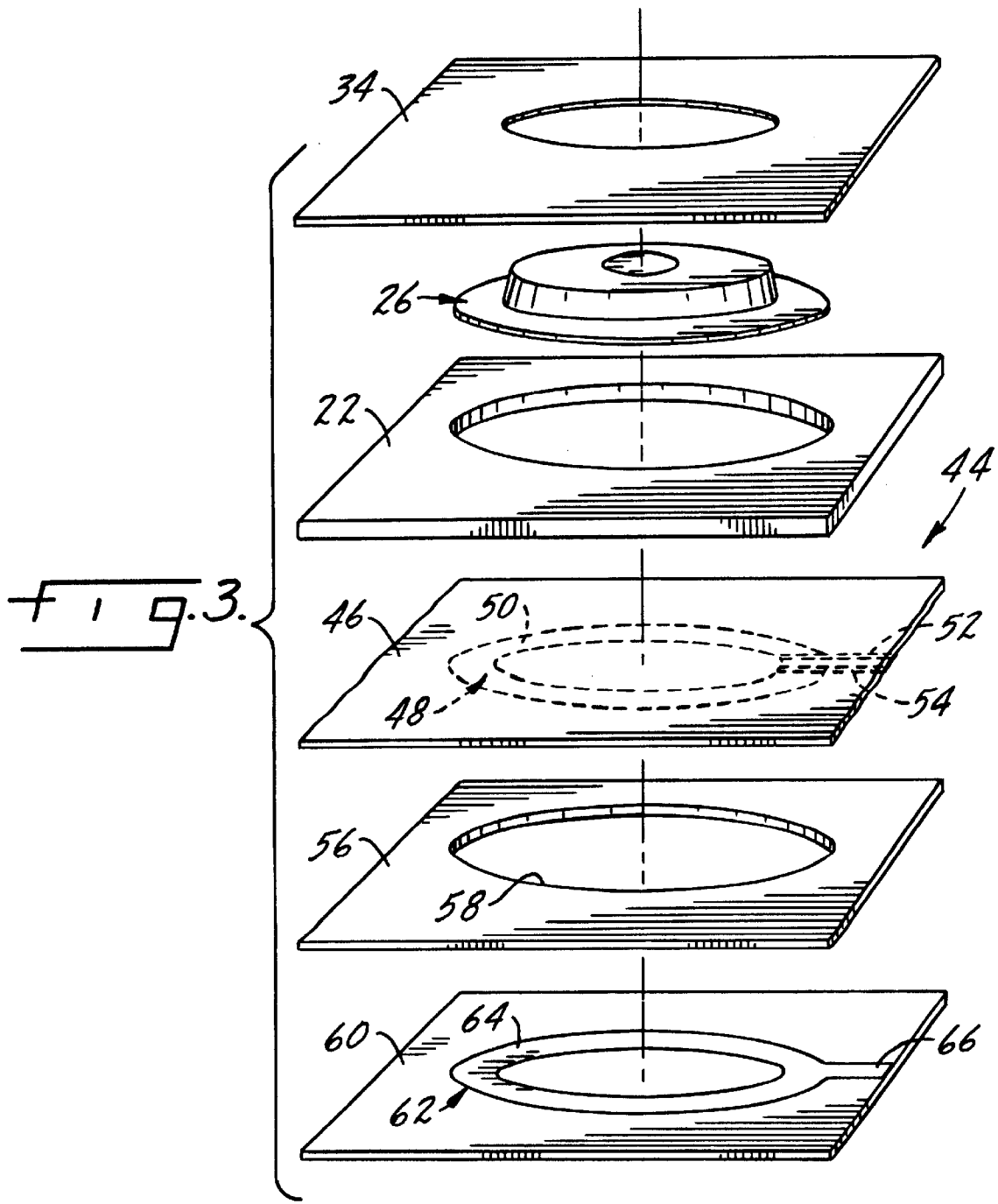
FIG. 3 is an exploded perspective view of the switch according to a second embodiment of the invention.

FIGS. 1 and 2 illustrate a first embodiment of the switch 10 of the present invention. Describing the switch from the bottom up, a carrier layer or substrate 12 provides the base of the switch. The carrier is electrically insulating. It can be rigid or flexible as required by a particular application. The carrier layer can be made of a variety of materials depending on the application and environment. Polyester film, circuit boards and dielectric-coated thin steel sheets are possibilities. While only a single switch is shown in the illustrated embodiment, it will be understood that a single carrier layer could be used with multiple switches. In fact one of the advantages of the present invention is the ability to provide multiple switches in a very small space.

The carrier has a part of a set of electrodes 14 formed on its upper surface. The electrodes may be formed by screen printing, etching or other suitable process. In this embodiment the electrodes 14 are arranged in the form of a potentiometer including a circular resistive element 16 and connecting leads 18 and 20. The resistive element is not a complete circle; it has a gap where the element terminates. Leads 18, 20 connect to these terminating points and extend to the edge of the carrier 12. The leads 18, 20 connect to suitable external circuitry (not shown). In this case the leads are connected to different voltages, e.g., one lead is connected to a voltage source and the other to ground. Accordingly, a variable voltage would be present around the circumference of the resistive element 16. The set of electrodes 14 further comprises a signal lead formed on the underside of the coupler layer, as will be described below.

A spacer 22 lies on top of the carrier 12. The spacer is made of insulating material. It has an opening 24 therein which defines a cavity between the carrier 12 and coupler layer described later. The opening 24 is aligned with the resistive element 14 so as to provide access thereto. In this embodiment the opening is slightly larger than the armature, which allows the spacer to perform an armature locating function, i.e., it prevents the armature from being displaced. However, the spacer could have alternate configurations in certain circumstances. For example, if the carrier and coupler are sufficiently rigid, the separating function of the spacer could be met by a spacer located only at the edges of the layers, with the interior fully open. Or portions of the spacer might cross over the electrodes to mechanically define separate portions of the electrodes. In any case, the spacer must at least partially separate the carrier and coupler layers.

An armature 26 fits in the spacer opening 24. The armature is made of electrically conductive, magnetic material. By magnetic material it is meant that the material is affected by a magnet. Steel is suitable. The armature shown has a generally flat rim 28 or periphery and a frusto-conical crown 30. The frusto-conical shape allows the crown to fit easily through an aperture in the coupler layer.

At the center of the crown is a post 32. The post may extend beneath the bottom of the crown where it serves as a fulcrum about which the rim tilts when actuated. The post may be spaced from the carrier 12 or it may be long enough to constantly engage the carrier. The post is an optional feature that is not always required. If the post is included it provides an additional option of building a switch into the post. That is, the set of electrodes may include leads which will open or close as the post moves up and down with the armature. Or the post may be made of rubber impregnated with conductive particles, e.g., carbon or iron particles. Again electrodes are provided to connect external electronics to the post. In this configuration the post can act as an acceleration switch in which its output varies with the pressure a user applies to the post. This is because the resistance of the impregnated rubber post varies with pressure. In the case of a mouse application, a rubber post would be employed to allow the user to control how fast a cursor moves. The harder the user pressed on the post, the faster the cursor would move. A further variation would be to make the post rigid and form the electrodes from a compressible material whose electrical output would vary with the amount of pressure exerted by the user.

The switch 10 is completed by a coupler layer 34. The coupler is a magnet. Thus, it attracts the armature to it. An aperture 36 through the coupler 34 has a diameter slightly larger than that of the crown 30 at the rim 28. This permits the crown to fit into and through the aperture. The rim 28, however, has a larger diameter than the aperture 36 so the upper surface of the rim 28 engages the lower surface of the coupler surrounding the aperture 36. This prevents the armature from being separated from the coupler. Preferably, the height of the crown and the thickness of the coupler are such that the crown protrudes somewhat above the upper surface of the coupler. The upper surface may have suitable graphics indicating the switch's function or operating instructions. The graphics may be printed directly on the coupler or on an overlay film attached to the coupler.

As mentioned above, part of the set of electrodes 14 is carried by the underside of the coupler 34. A signal lead 38 is printed on the coupler. It has a pickup portion 40 and a connector lead 42. The pickup portion completely surrounds the aperture 36. It is wide enough to always maintain contact with some part of the rim 28. The connector lead 42 extends to an edge of the coupler where it connects to external electronics (not shown). In the arrangement shown the signal lead 38 acts as the wiper connection of a potentiometer.

The use, operation and function of the invention are as follows. When the switch is in an unactuated state, the magnetic attraction between the armature 26 and coupler 34 holds the armature in its open position. In the open position the entire armature is spaced from the carrier 12. The entire rim 28 engages the underside of the coupler, in engagement with the pickup portion 40 of signal lead 38. The resistive element 16 has the source voltage applied between its ends but no output is provided on signal lead 38 because there is no connection or contact between the signal lead and the resistive element.

When a user desires to activate the switch, he or she presses on an edge of the crown 30 of armature 26. Doing so will cause the rim underneath the point of pressure to break away from the coupler. The armature will pivot about the side of the rim opposite the point of pressure. The armature will tilt into contact with the resistive element 16. Contact between the rim 28 and the resistive element 16 causes a signal voltage to appear on the signal lead. The value of the signal voltage will depend on the value of the source voltage and the location of the contact on the resistive element. Since the source voltage is known, the signal voltage provides an indication of where the contact took place. For example, if the signal voltage is half of the source voltage, the armature/resistive element contact point would have to be half way around the circumference of the resistive element. Thus, it can be determined where on the armature the user applied the actuating pressure.

The post 32 prevents the user from breaking the entire armature away from the coupler. It assures that tilting of the armature will occur upon actuation, even if the user presses on the center of the crown 30.

While the electrodes 14 are arranged in the form of a potentiometer, it will be understood that other arrangements are possible. The term electrodes is intended to cover any desired arrangement of the electrical conductors. For example, the electrodes may be arranged into multiple sets of spaced contact pads to be shorted by an actuated armature. In this example one pad of an adjacent but spaced pair of pads has an applied source voltage while the other does not. Actuating the armature shorts the pads and causes an output to appear on the normally non-energized pad. Associated electronics can sense which pad was shorted, thereby identifying where the armature was pressed.

The switch of the present invention can be described as directionally sensitive because it can identify the location on the armature where it was pressed. This makes the switch useful in applications such as a computer mouse. If a user wants to move a cursor to the right, he or she would press on the right side of the armature. The same would be true of left, up, down or diagonal. If the accelerator feature of the post is supplied, harder pressure would make the cursor move faster. But the mouse is just one example of a specific application. Many others are possible. Just about any application requiring an up or down setting, e.g., temperature settings, radio or television station selection, could benefit from the present switch.

Figure 4:
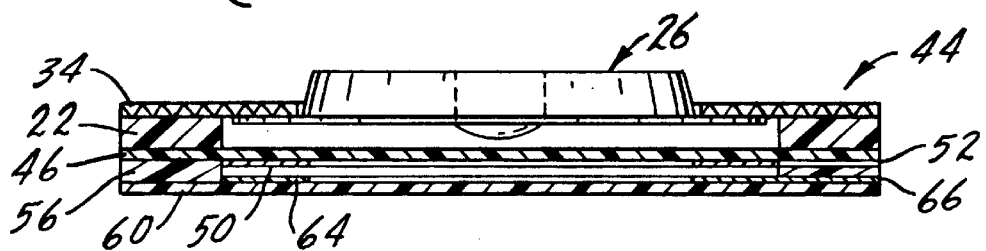
FIG. 4 is a section through the switch of FIG. 3.

FIGS. 3 and 4 illustrate an alternate embodiment of the present invention. Switch 44 has a spacer 22, armature 26 and coupler 34 similar to that in FIGS. 1 and 2 so the description of these parts will not be repeated. The previous carrier layer 12, however, is replaced by a membrane layer 46. Membrane 46 is made of flexible material such as polyester. On the underside of the membrane is a portion of a set of electrodes 48. The illustrated electrode is similar to electrode 14 in that is has a resistive element 50 and leads 52 and 54. The leads connect to external electronics (not shown). Beneath the membrane 46 is a spacer 56 that has a central aperture 58. The spacer overlies a substrate 60 which may either be rigid or flexible as the application requires. The top surface of the substrate carries the remainder of the set of electrodes, in this case a signal lead 62 having a pickup portion 64 and connector lead 66, similar to signal lead 38.

The operation of the switch 44 is as follows. When the switch is in an unactuated state coupler 34 holds the armature out of contact with the membrane 46. When a user desires to activate the switch, he or she presses on an edge of the crown 30 of armature 26. Doing so will cause the rim underneath the point of pressure to break away from the coupler. The armature will pivot about the side of the rim opposite the point of pressure. The armature will tilt into contact with the top surface of the membrane 46. Contact between the rim 28 and the membrane causes the membrane to flex through the spacer opening 58, carrying the resistive element 50 into contact with pickup portion 64 of signal lead 62. This causes a signal voltage to appear on the signal lead. The value of the signal voltage will depend on the value of the source voltage and the location of the contact on the resistive element, as in the previous embodiment. Release of the actuating pressure will allow the coupler to retract the armature, thereby removing the pressure on the membrane. The membrane's natural resilience will cause it to move out of contact with the substrate and break the engagement of the electrodes.

While a preferred form of the invention has been shown and described, it will be realized that alterations and modifications may be made thereto without departing from the scope of the following claims. For example, as a further alternate to the FIG. 3 embodiment, two separate sets of electrodes could be incorporated into the switch. That is, in addition to the electrodes on the bottom of the membrane and top of the substrate, a second set could be included on top of the membrane and the bottom of the coupler, as shown in FIG. 1.

What is claimed is:

1. An electrical switch, comprising:
   a carrier having a part of a set of electrodes formed on at least one side thereof, the electrodes being arranged to produce different outputs when contacted in different locations;
   a coupler layer adjacent said one side of the carrier;
   a spacer separating the carrier and coupler and defining at least one cavity therein between the carrier and coupler; and
   a conductive armature disposed in said cavity and having a rim, one of the coupler and armature being a magnet and the other being made of magnetic material such that the magnetic attraction between the coupler and armature normally holds at least the rim of the armature on the coupler in an open position, wherein the entire armature is spaced from the carrier, the armature being movable to a closed position, wherein a first portion of the rim contacts the electrodes and a second portion of the rim remains in contact with the coupler, the armature being arranged such that any portion of the rim can act as said first portion and any portion of the rim can act as said second portion, depending on the location of an actuating force on the armature.

2. The switch of claim 1 further comprising an aperture in the coupler layer aligned with the armature.

3. The switch of claim 2 wherein the armature further comprises a crown upstanding from the rim, the crown extending at least partially into the aperture in the coupler layer.

4. The switch of claim 3 wherein the crown has a frusto-conical cross section.

5. The switch of claim 1 further comprising a post between the armature and carrier.

6. The switch of claim 5 wherein the post comprises a pressure sensitive electrical switch.

7. The switch of claim 6 wherein the pressure sensitive switch comprises carbon particles in a rubber matrix.

8. The switch of claim 1 wherein the armature is generally circular.

9. The switch of claim 1 wherein the set of electrodes further comprises a conductor formed on the side of the coupler layer facing the cavity and in contact with the rim.

10. The switch of claim 9 further comprising an aperture in the coupler layer aligned with the armature and wherein said conductor surrounds said aperture.

11. The switch of claim 9 wherein the set of electrodes on the carrier comprises a resistive element.

12. An electrical switch which is closable by an actuating member, said switch comprising:
   a carrier having a part of a set of electrodes formed on at least one side thereof, the electrodes being arranged to produce different outputs when contacted in different locations;
   a coupler layer adjacent said one side of the carrier and having an aperture therein;
   a spacer separating the carrier and coupler and defining at least one cavity therein between the carrier and coupler; and
   a conductive armature in said cavity aligned with the aperture and having a rim engageable with the coupler, one of the coupler and armature being a magnet and the other being made of magnetic material such that the magnetic attraction between the coupler and armature normally holds the armature in an open position, wherein the entire armature is spaced from the carrier, the armature being movable, under the force of said actuating member acting through the aperture, from its open position to a closed position, wherein a first portion of the rim contacts the electrodes and a second portion of the rim remains in contact with the coupler, the entire rim being both engageable with and separable from the coupler such that any part of the rim can act as said first portion and any part of the rim can act as said second portion, depending on the location of contact between the actuating member and the armature.

13. The switch of claim 12 wherein the armature further comprises a crown upstanding from the rim, the crown extending at least partially into the aperture in the coupler layer.

14. The switch of claim 13 wherein the crown has a frusto-conical cross section.

15. The switch of claim 12 further comprising a post between the armature and carrier.

16. The switch of claim 15 wherein the post comprises a pressure sensitive electrical switch.

17. The switch of claim 16 wherein the pressure sensitive switch comprises carbon particles in a rubber matrix.

18. The switch of claim 12 wherein the armature is generally circular.

19. The switch of claim 12 wherein the set of electrodes further comprises a conductor formed on the side of the coupler layer facing the cavity.

20. The switch of claim 19 wherein said conductor surrounds said aperture.

21. The switch of claim 19 wherein the set of electrodes on the carrier comprises a resistive element.

22. An electrical switch which is closable by an actuating member, said switch comprising:
   a carrier having a part of a set of electrodes formed on at least one side thereof, the electrodes being arranged to produce different outputs when contacted in different locations;
   a coupler layer adjacent said one side of the carrier and having an aperture therein;
   a spacer separating the carrier and coupler and defining at least one cavity therein between the carrier and coupler; and
   a conductive armature in said cavity aligned with and at least partially spanning the aperture, one of the coupler and armature being a magnet and the other being made of magnetic material such that the magnetic attraction between the coupler and armature normally holds the armature in an open position, wherein the entire armature is spaced from the carrier, the armature being movable under the influence of an actuating force imparted by said actuating member on a first portion of the armature which creates a moment about a second portion of the armature, thereby causing the armature to tilt from its open position to a closed position, wherein said first portion of the armature contacts the electrodes and said second portion of the armature remains in contact with the coupler, the aperture being large enough relative to the actuating member to allow the actuating member to selectably move all portions of the armature at its periphery into contact with the electrodes.

23. The switch of claim 22 wherein the armature comprises a rim engageable with the coupler layer and a crown upstanding from the rim, the crown extending at least partially into the aperture in the coupler layer.

24. The switch of claim 23 wherein the crown has a frusto-conical cross section.

25. The switch of claim 22 further comprising a post between the armature and carrier.

26. The switch of claim 25 wherein the post comprises a pressure sensitive electrical switch.

27. The switch of claim 26 wherein the pressure sensitive switch comprises carbon particles in a rubber matrix.

28. The switch of claim 22 wherein the armature is generally circular.

29. The switch of claim 22 wherein the set of electrodes further comprises a conductor formed on the side of the coupler layer facing the cavity.

30. The switch of claim 29 wherein said conductor surrounds said aperture.

31. The switch of claim 29 wherein the set of electrodes on the carrier comprises a resistive element.

32. An electrical switch which is closable by an actuating member, said switch comprising:

a membrane switch having a flexible membrane and a substrate separated by a spacer having a first aperture therein, and a set of electrodes formed on facing surfaces of the membrane and substrate in the area of the first aperture, the membrane being movable through the first aperture to open and close the electrodes;

a coupler layer adjacent the membrane and having a second aperture therein;

a spacer separating the membrane and coupler and defining at least one cavity therein between the membrane and coupler; and an armature in said cavity aligned with the second aperture and engageable with the coupler one of the coupler and armature being a magnet and the other being made of magnetic material such that the magnetic attraction between the coupler and armature normally holds the armature in an open position, wherein the entire armature is spaced from the membrane, the armature being movable, under the force of said actuating member acting through the second aperture, from its open position to a closed position, wherein a first portion of the armature anywhere at its periphery contacts and closes the membrane switch and a second portion of the armature anywhere at its periphery remains in contact with the coupler.

33. The switch of claim 32 wherein the electrodes are arranged to produce different outputs when actuated in different locations.

34. The switch of claim 32 wherein the armature comprises a rim, the entire rim being both engageable with and separable from the coupler such that any part of the rim can act as said first portion and any part of the rim can act as said second portion, depending on the location of contact between the actuating member and the armature.

* * * * *